United States Patent
Kassab

(10) Patent No.: US 11,286,814 B1
(45) Date of Patent: Mar. 29, 2022

(54) EXHAUST DUCT OF GAS TURBINE ENGINE

(71) Applicant: PRATT & WHITNEY CANADA CORP., Longueuil (CA)

(72) Inventor: Rabih Kassab, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/023,945

(22) Filed: Sep. 17, 2020

(51) Int. Cl.
| | |
|---|---|
| F01D 25/28 | (2006.01) |
| F01D 25/30 | (2006.01) |
| F02K 1/04 | (2006.01) |
| F01D 25/24 | (2006.01) |
| F02K 1/80 | (2006.01) |
| F02C 7/20 | (2006.01) |
| F02K 1/38 | (2006.01) |

(52) U.S. Cl.
CPC ............ *F01D 25/28* (2013.01); *F01D 25/243* (2013.01); *F01D 25/30* (2013.01); *F02K 1/04* (2013.01); *F02K 1/80* (2013.01); F02C 7/20 (2013.01); *F02K 1/386* (2013.01); *F05D 2240/90* (2013.01); *F05D 2240/91* (2013.01)

(58) Field of Classification Search
CPC .............. F02K 1/04; F02K 1/386; F02K 1/80
See application file for complete search history.

(56) References Cited

U.S. PATENT DOCUMENTS

| | | | | |
|---|---|---|---|---|
| 8,739,513 | B2* | 6/2014 | Lefebvre et al. | F02K 1/386 60/39.5 |
| 9,200,537 | B2 | 12/2015 | Bouchard et al. | |
| 10,018,150 | B2 | 7/2018 | Marini et al. | |
| 10,443,447 | B2 | 10/2019 | King et al. | |
| 10,858,957 | B2* | 12/2020 | Perez | F01D 9/041 |
| 2013/0115076 | A1 | 5/2013 | Bouchard et al. | |
| 2015/0285098 | A1* | 10/2015 | De Sousa et al. | F01D 9/04 415/214.1 |
| 2018/0171932 | A1* | 6/2018 | De Sousa et al. | F02K 1/04 |
| 2020/0003157 | A1* | 1/2020 | Clements et al. | F02C 3/107 |

* cited by examiner

*Primary Examiner* — Katheryn A Malatek
*Assistant Examiner* — Alyson Joan Harrington
(74) *Attorney, Agent, or Firm* — Norton Rose Fulbright Canada LLP

(57) ABSTRACT

An exhaust duct of a gas turbine engine comprises a hub defining a radially-inner surface of a substantially annular exhaust gas path, and a strut extending into the exhaust gas path. The strut is attached to the hub via a first fastener at a forward fastening location closer to a leading edge of the strut than to a trailing edge of the strut, and via a second fastener at an aft fastening location closer to the trailing edge than to the leading edge. The second fastener is engaged with an appendage of the strut. The appendage is received into a receptacle formed in the hub open to the radially-inner surface.

20 Claims, 14 Drawing Sheets

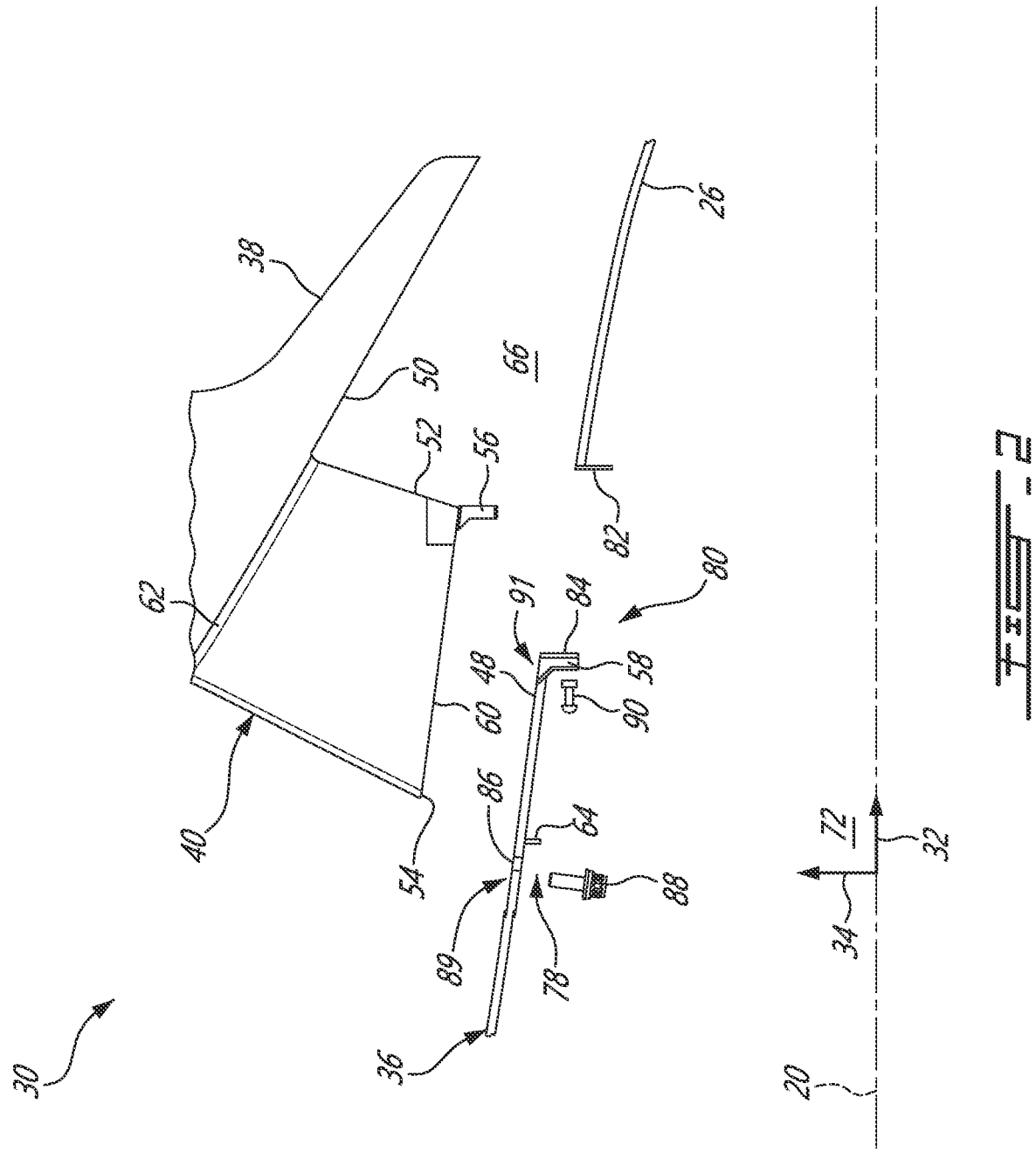

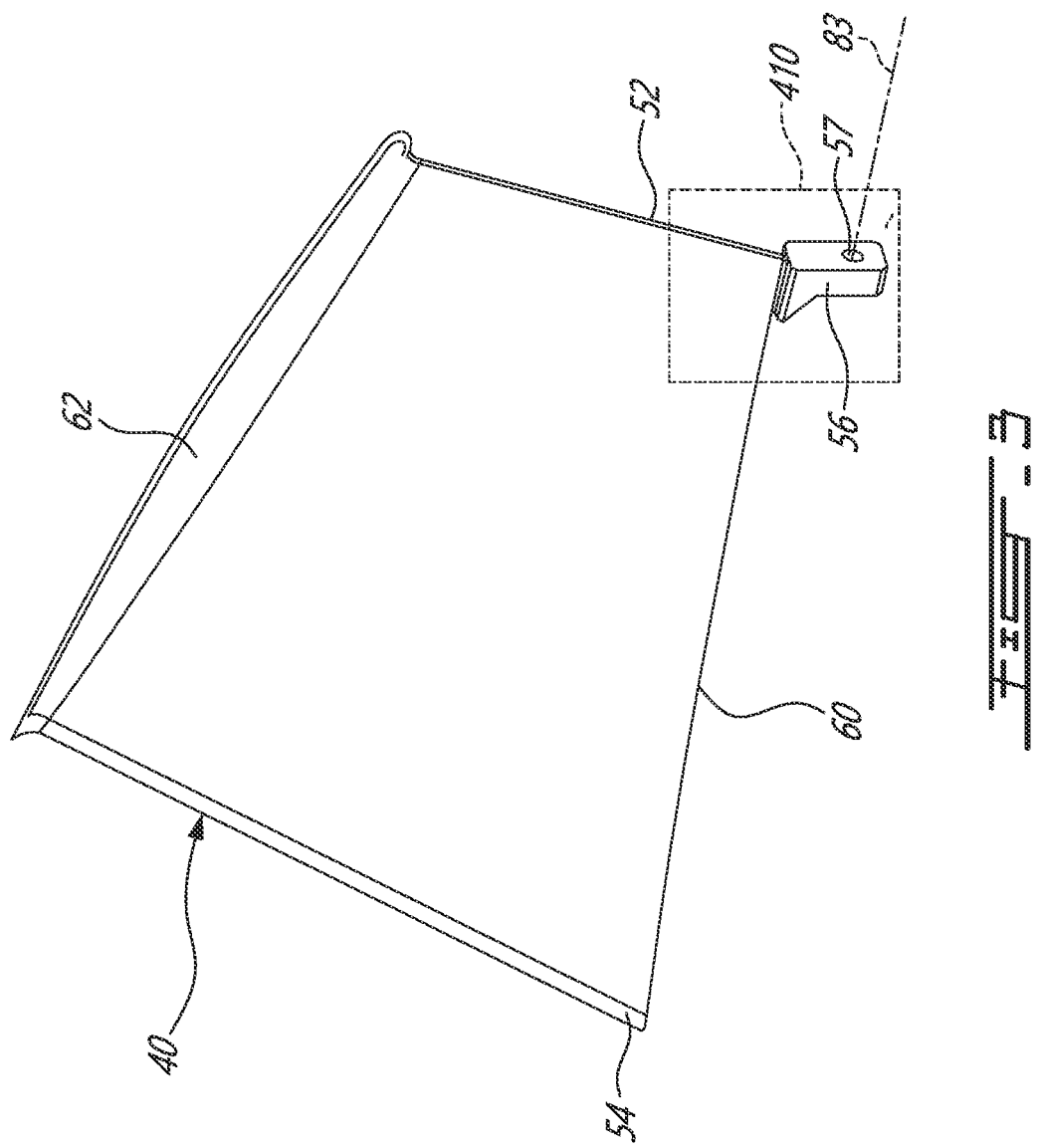

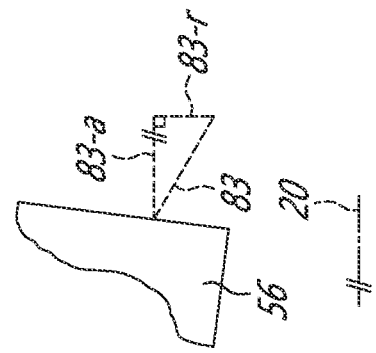
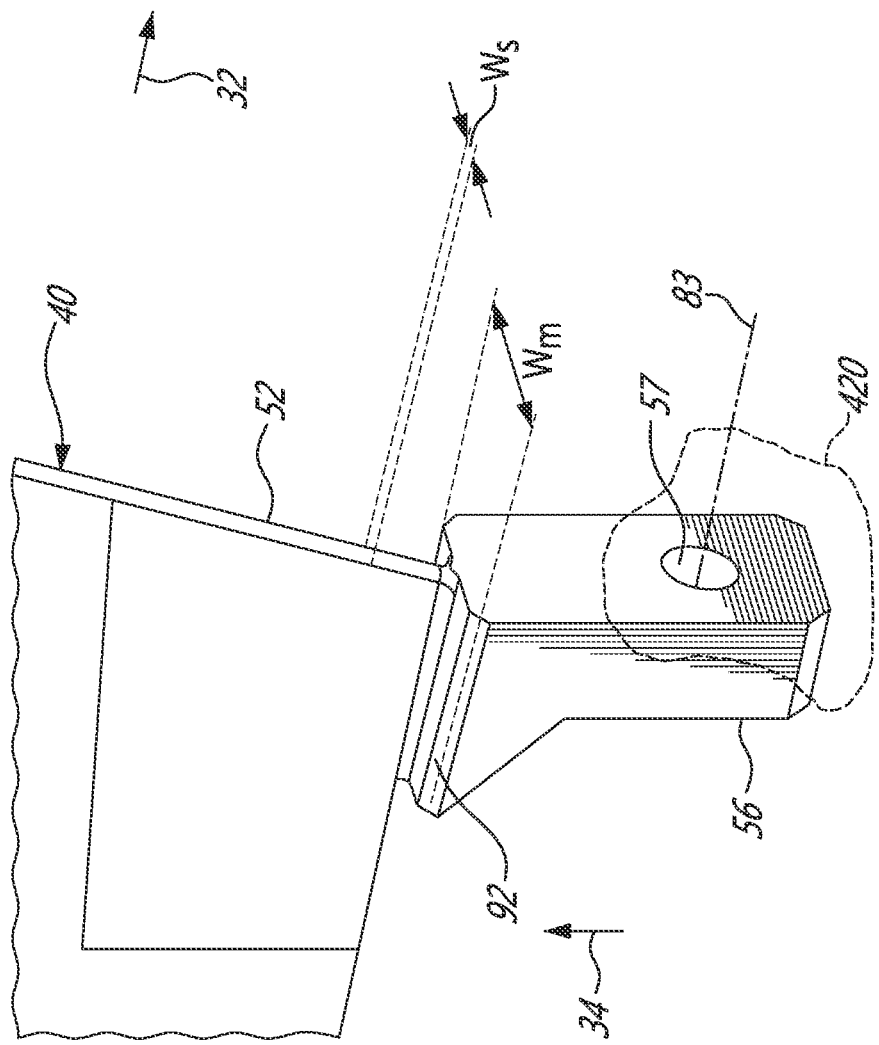

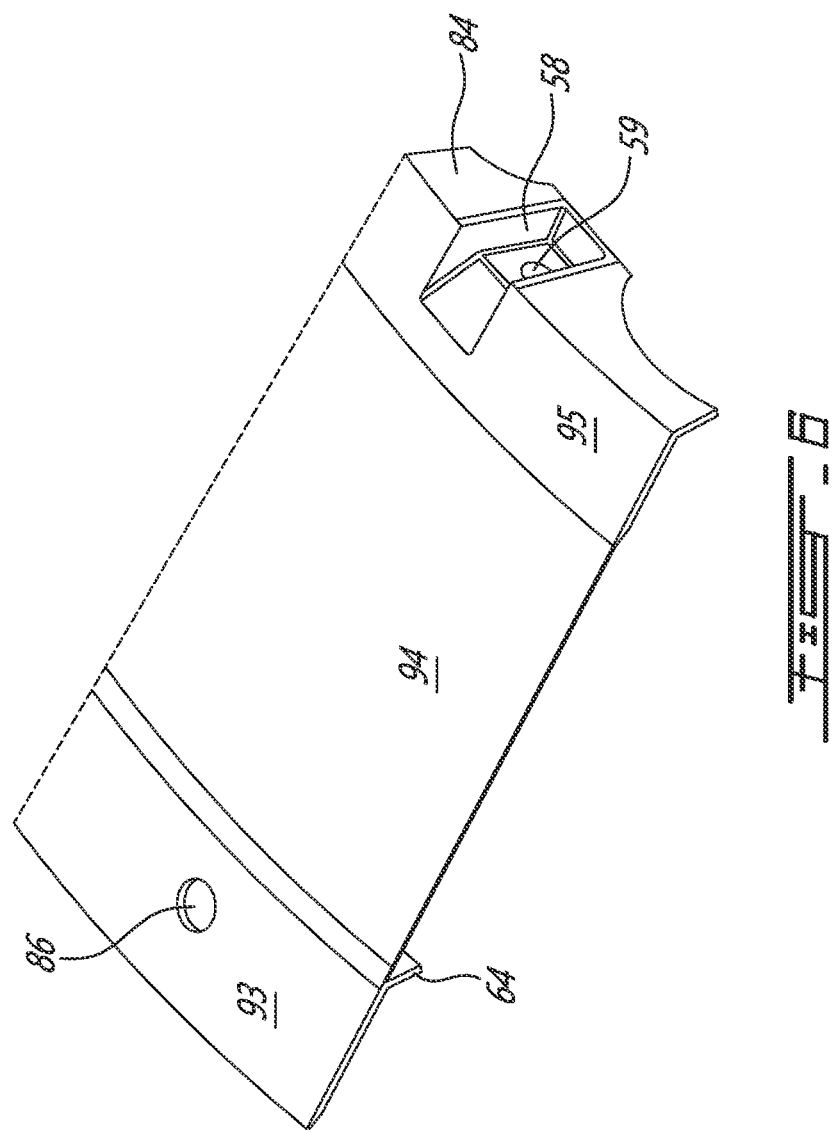

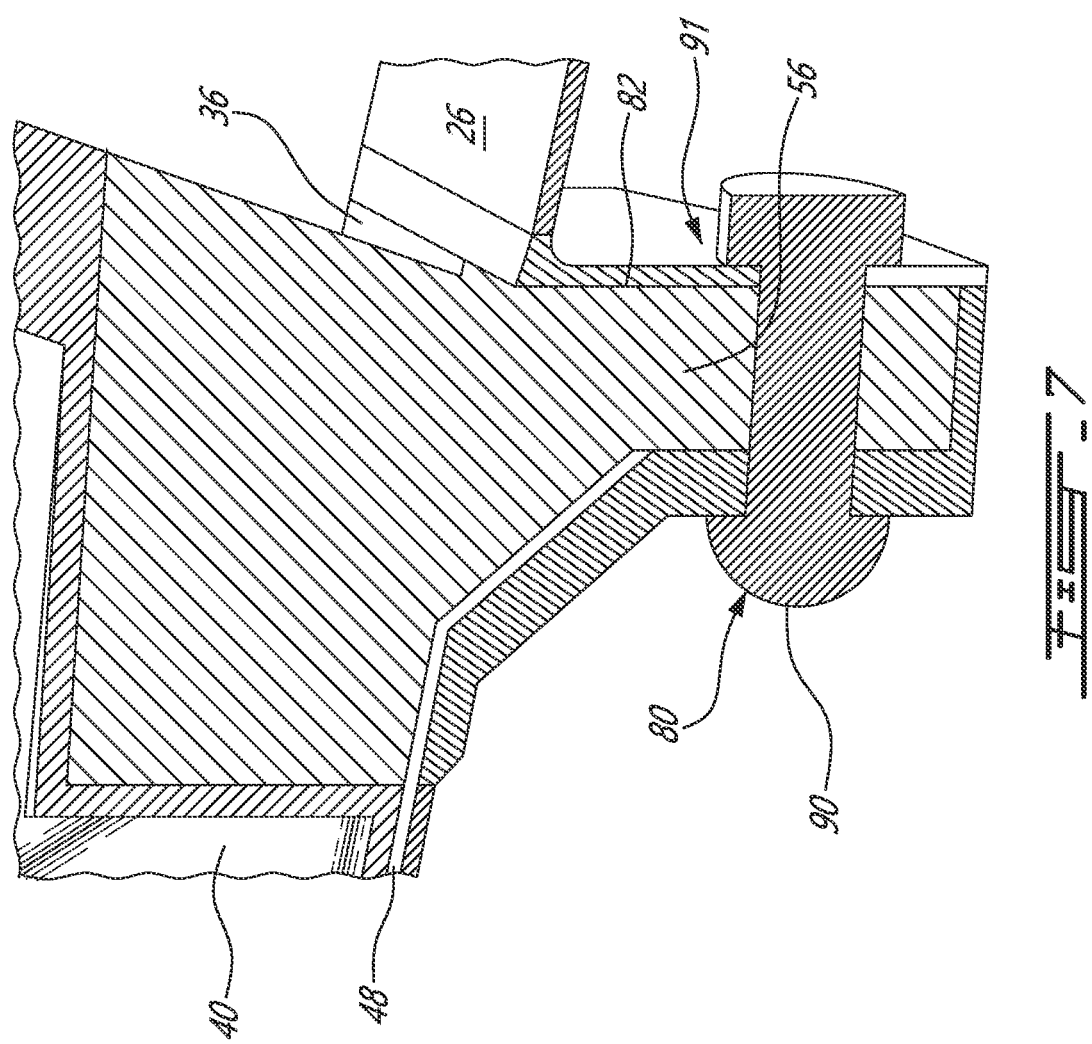

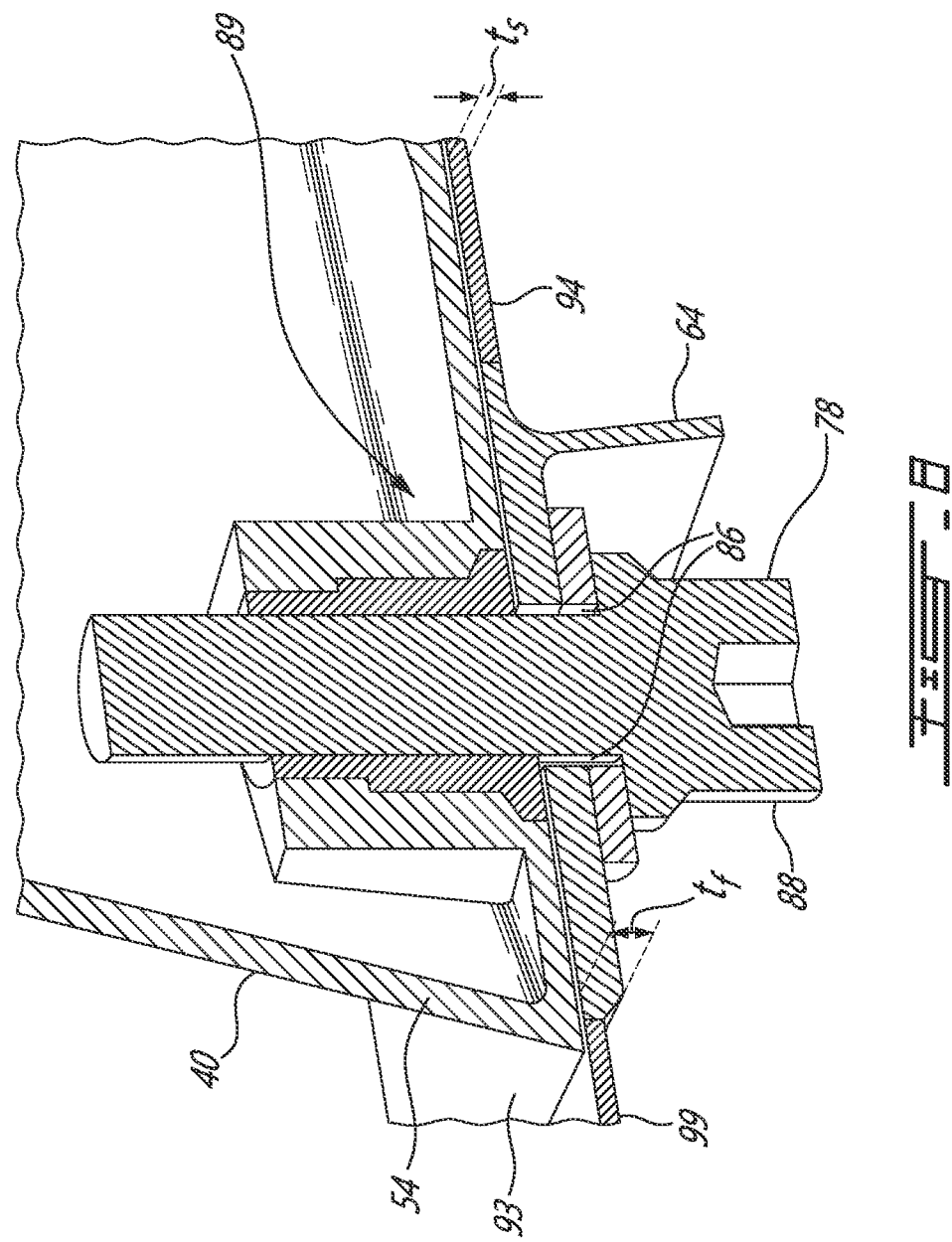

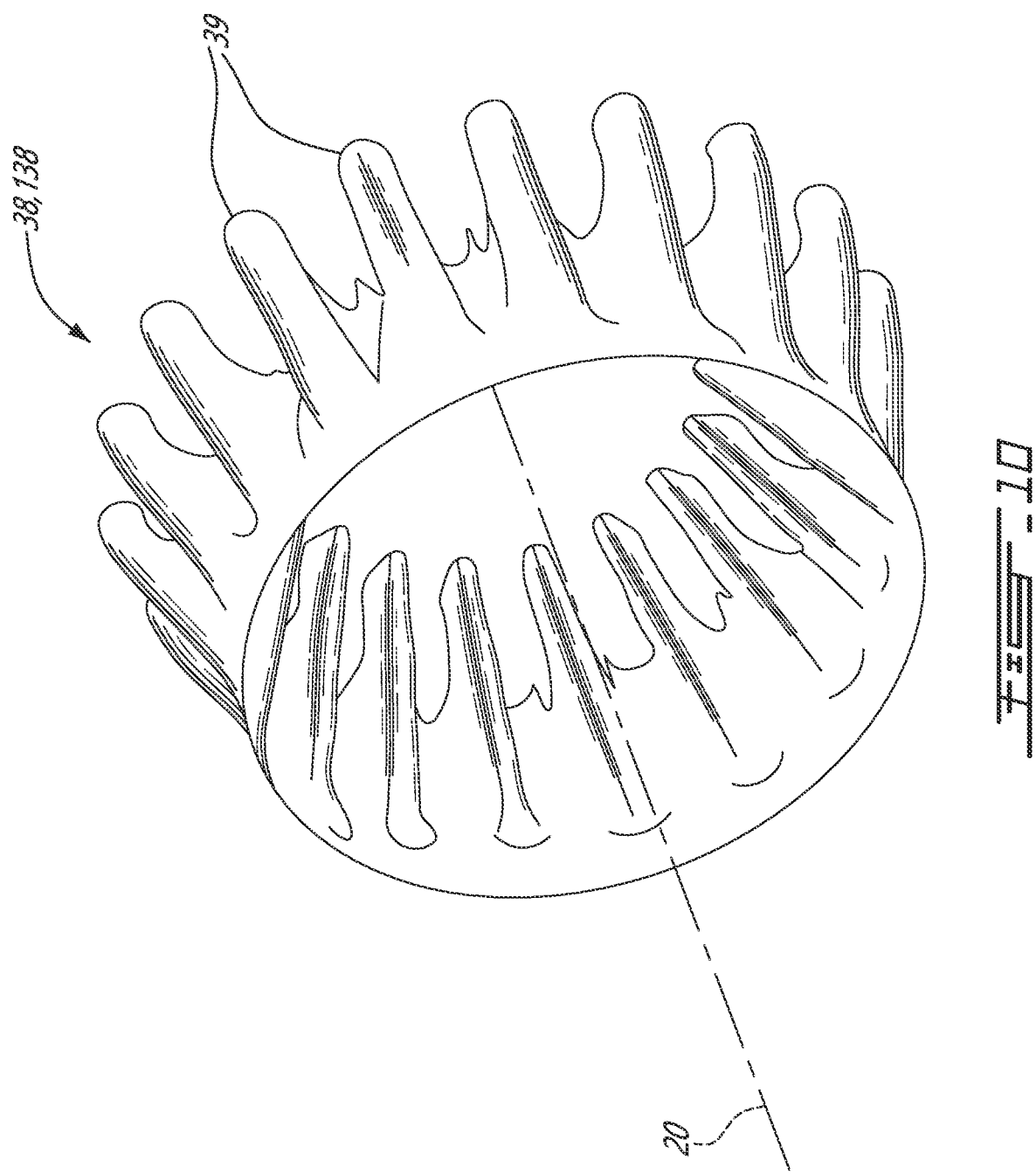

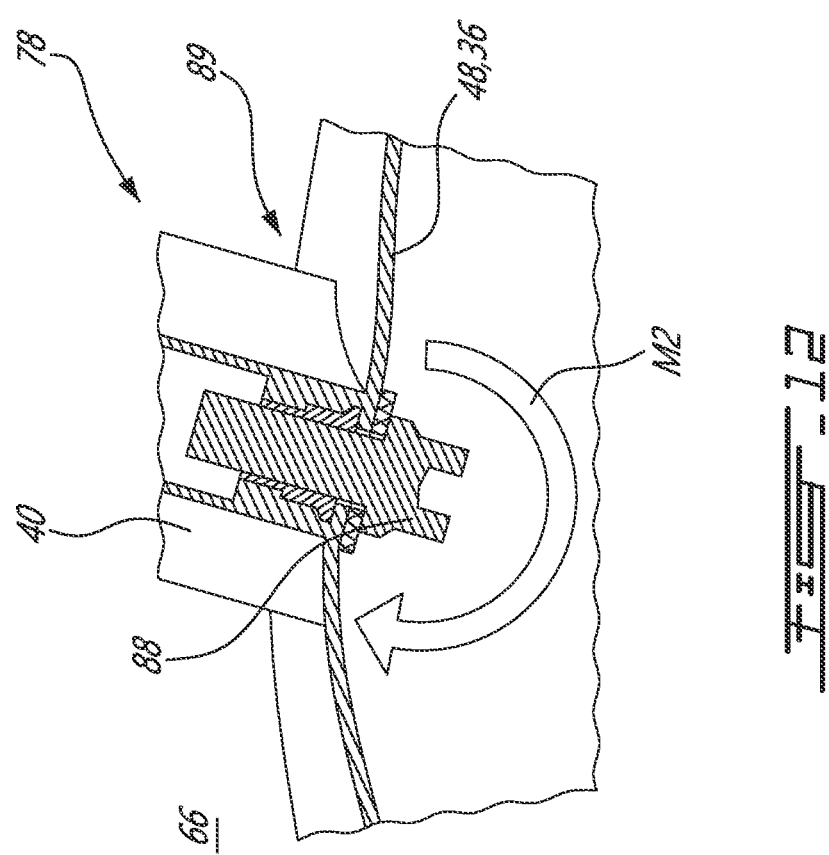

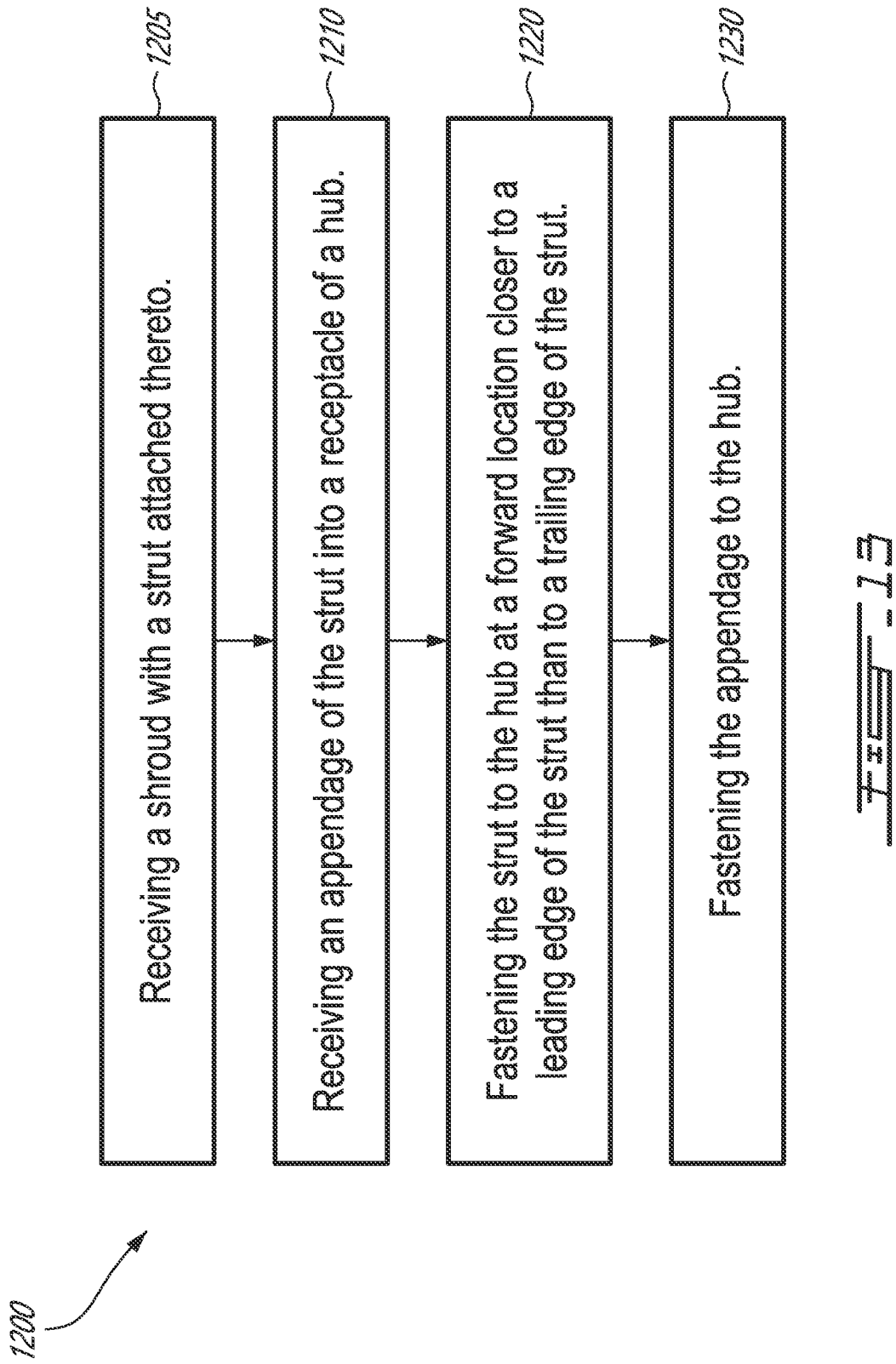

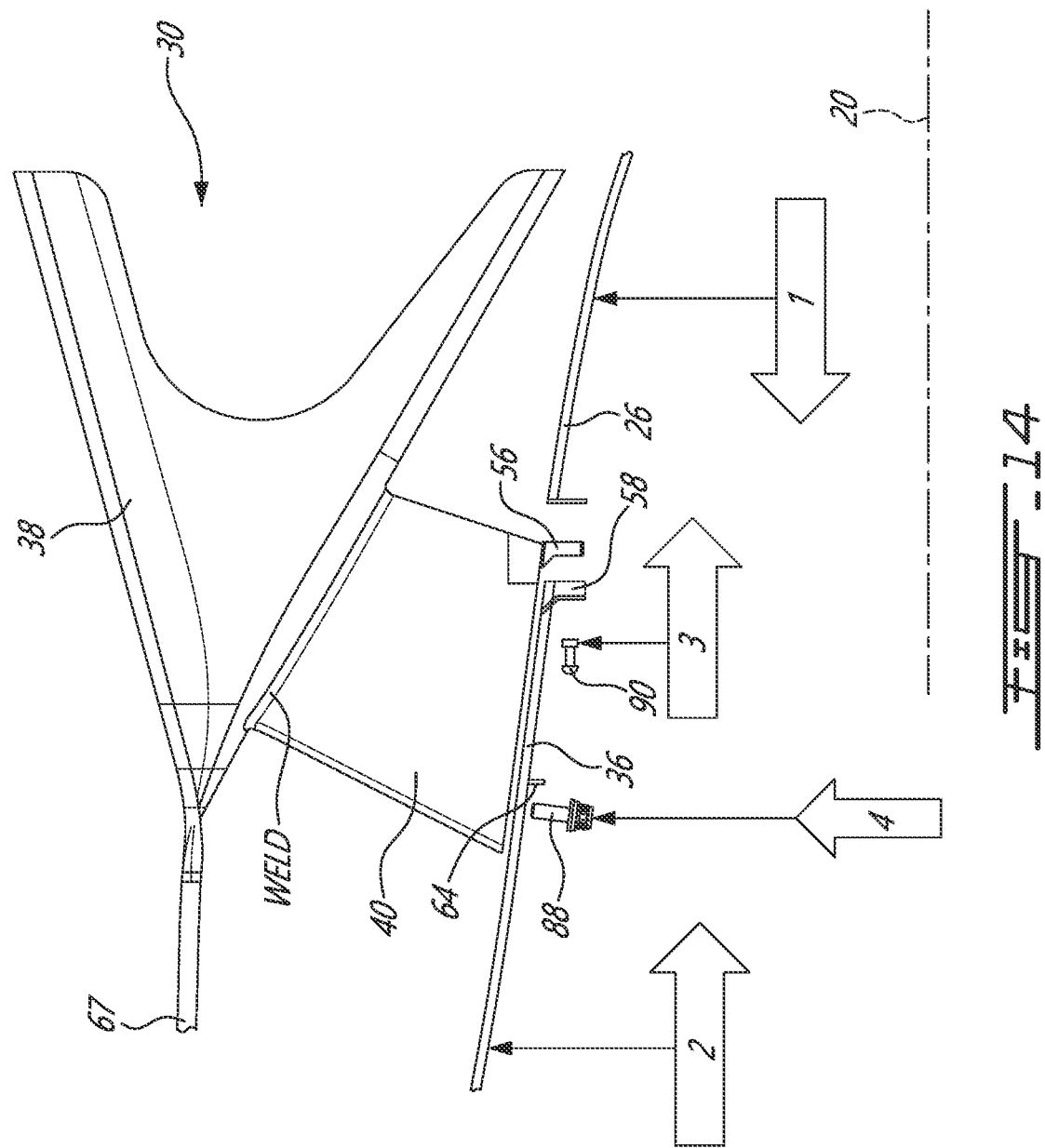

EXHAUST DUCT OF GAS TURBINE ENGINE

TECHNICAL FIELD

The application relates generally to gas turbine engines and, more particularly, to exhaust ducts of gas turbine engines.

BACKGROUND OF THE ART

Hot combustion gas from a turbine section of a (e.g., turbofan) gas turbine engine are exhausted into the ambient atmosphere via an exhaust case, sometimes referred to as "turbine exhaust case" (TEC) of the gas turbine engine. The exhaust case may include a hub concentrically arranged within an outer shroud to define an exhaust gas path therebetween. One or more struts may be disposed in the exhaust gas path and connect the hub with the outer shroud. Aerodynamic or other forces applied to the hub, outer shroud and/or strut can cause stress and deflection in parts of some exhaust cases. Improvement is desired.

SUMMARY

In one aspect, the following disclosure describes a turbofan gas turbine engine comprising:

a combustor in which compressed air is mixed with fuel and ignited for generating an annular stream of hot combustion gas;

a turbine for extracting energy from the combustion gas, the turbine having a rotation axis;

a hub defining a radially-inner surface of a substantially annular exhaust gas path extending around the rotation axis and disposed downstream of the turbine for receiving the combustion gas, the hub including a receptacle formed into the radially-inner surface;

a lobed mixer defining a radially-outer surface of the substantially annular exhaust gas path; and a strut extending between the radially-inner surface and the radially-outer surface of the substantially annular exhaust gas path, the strut attached to the hub via a first fastener and via a second fastener, the second fastener being disposed axially downstream of the first fastener relative to the rotation axis of the turbine, the strut including an appendage received into the receptacle of the hub, the second fastener being engaged with the appendage.

In another aspect, the following disclosure describes a gas turbine engine exhaust duct comprising:

a hub defining a radially-inner surface of a substantially annular exhaust gas path of a gas turbine engine, the hub including a receptacle open to the exhaust gas path;

a shroud defining a radially-outer surface of the exhaust gas path; and a strut extending into the exhaust gas path between the radially-inner surface and the radially-outer surface, the strut including a leading edge and a trailing edge, the strut attached to the hub via a first fastener at a forward fastening location closer to the leading edge than to the trailing edge, and via a second fastener at an aft fastening location closer to the trailing edge than to the leading edge, the strut including an appendage received into the receptacle of the hub, the second fastener being engaged with the appendage.

In a further aspect, the following disclosure describes a method of attaching a strut in a substantially annular exhaust gas path defined by an exhaust duct of a gas turbine engine. The exhaust duct has a hub defining a radially-inner surface of the exhaust gas path, and a shroud defining a radially-outer surface of the exhaust gas path. The method comprises:

receiving the shroud with the strut attached thereto;

receiving an appendage of the strut into a receptacle of the hub, the appendage being disposed at an aft fastening location closer to a trailing edge of the strut than to a leading edge of the strut;

fastening the appendage to the hub; and fastening the strut to the hub at a forward fastening location closer to the leading edge of the strut than to the trailing edge of the strut.

DESCRIPTION OF THE DRAWINGS

Reference is now made to the accompanying figures in which:

FIG. 2 is an exploded sectional view of an exemplary exhaust duct of the gas turbine engine of FIG. 1, in an axial-radial plane;

FIG. 3 is a perspective view of a strut of the exhaust duct of FIG. 2;

FIG. 4A is an enlarged view of region 410 of FIG. 3;

FIG. 4B is an enlarged side elevation view of region 420 of FIG. 4A;

FIG. 6 is a perspective section view of a portion of the hub taken along line 6-6 of FIG. 5;

FIG. 7 is a perspective schematic view of a section of the exhaust duct of FIG. 2 taken in an axial-radial plane, showing the strut engaged with a hub of the exhaust duct at an aft fastening location of the strut;

FIG. 9 is a perspective exploded view of part of another exemplary exhaust duct, showing an appendage fastenable in a receptacle of the hub;

FIG. 10 is a perspective view of an exemplary lobed mixer of the exhaust duct of FIG. 2;

FIG. 12 is a front view of the exemplary turbine exhaust duct assembly of FIG. 11 showing magnified deformation under simulated torsional loading;

FIG. 13 is a flow chart of an exemplary method of attaching a strut in a turbine exhaust duct; and FIG. 14 is a graphical representation of an exemplary method of attaching a strut in a turbine exhaust duct.

DETAILED DESCRIPTION

The following disclosure describes turbine exhaust ducts, associated gas turbine engines and methods. A turbine exhaust duct may include a hub and a shroud defining an exhaust gas path, and one or more struts disposed in the exhaust gas path between the hub and the shroud. The struts may provide structural support within the exhaust duct and also prepare the flow of exhaust gas for downstream mixing with bypass air released from a bypass duct of a turbofan engine. The struts may be subjected to axial and torsional loads that are transmitted to the hub and/or shroud of the exhaust duct. Various embodiments described herein provide attachment (e.g., fastening and/or welding) configurations of struts that, in some situations, promote more favorable load transfer between struts and one or more other components (e.g., shroud and/or hub) of the exhaust duct in order to mitigate deformation of components of the exhaust duct. Also disclosed herein are methods for facilitating the installation of one or more struts in the exhaust duct.

The term "substantially" as used herein may be applied to modify any quantitative representation which could permissibly vary without resulting in a change in the basic function to which it is related.

Figure 1:
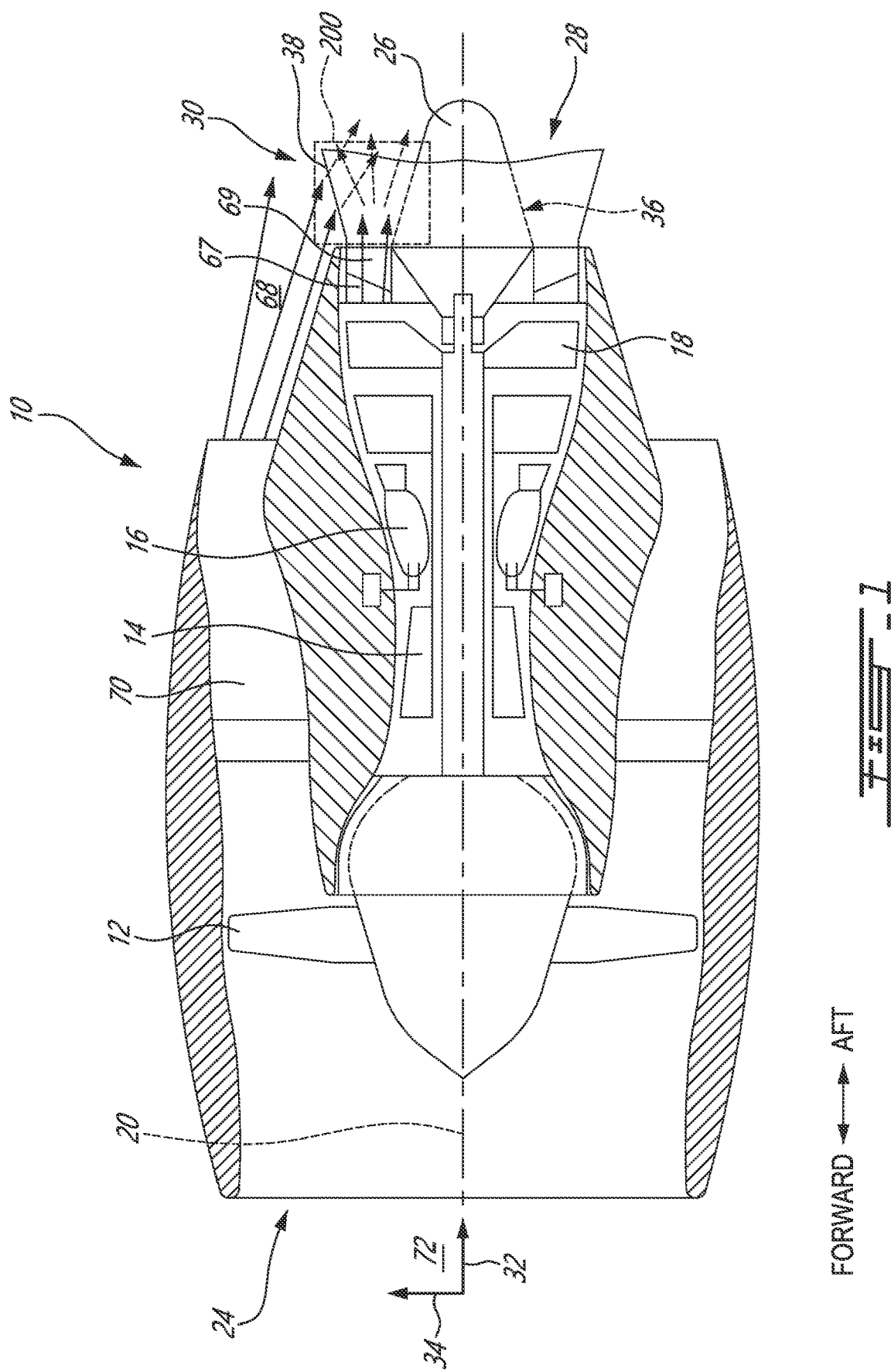
FIG. 1 is a schematic cross-sectional view of an exemplary gas turbine engine.

FIG. 1 illustrates a gas turbine engine 10 of a turbofan type preferably provided for use in subsonic flight, generally comprising in serial flow communication a fan 12 through which ambient air is propelled, and a compressor section 14 for pressurizing the air. The gas turbine engine 10 comprises a combustor 16 in which compressed air is mixed with fuel and ignited for generating an annular stream of hot combustion gas 69 and one or more turbines 18 (referred herein after in the singular) for extracting energy from the gas generated by combustion. A tail cone 26 may be disposed at an aft end 28 of the gas turbine engine 10. A central engine axis 20 may extend between a forward end 24 and the aft end 28 of the gas turbine engine 10. The turbine 18 may have a rotation axis that is coaxial with the central engine axis 20. The central engine axis 20 may define an axial direction 32 of the gas turbine engine 10 and a radial direction 34 perpendicular thereto. The axial-radial plane 72 illustrated in FIG. 1 contains the axial direction 32 and the radial direction 34. Unless stated otherwise, radially and axially should be understood in relation to the respective axial and radial directions 32, 34, and spacing or extension in these directions includes spacing or extension at least partially in the respective direction.

The turbine exhaust duct 30 may be disposed downstream of the turbine 18 and may include a hub 36 extending around and along the central engine axis 20. The hub 36 may be disposed forward of the tail cone 26. The exhaust duct 30 may generally comprise a strut 40 (shown in FIG. 2) extending at least partially radially, in the annular stream of combustion gas 69, between the hub 36 and a shroud 38. The strut 40 may be attached to both the shroud 38 and the hub 36 by welding, one or more fasteners or by having a unitary construction therewith. The shroud 38 may be configured as a lobed mixer. In some cases, a radially-inner end of the strut 40 may be fastened to the hub 36 via one or more fasteners while an opposite radially-outer end of the strut 40 may be welded to the shroud 38. The exhaust duct 30 may facilitate mixing of the hot combustion gas 69 with the relatively cold bypass air 68 exhausted from the bypass duct 70, e.g. to obtain a performance benefit in some situations. Components of the exhaust duct 30 such as hub 36 and shroud 38 may have a relatively thin wall (e.g., sheet-metal) construction and may consequently have a relatively low out-of-plane bending stiffness and torsional stiffness. In various embodiments, the exhaust duct 30 may include part of a turbine exhaust case 67 of the engine 10 and/or may include components downstream of the turbine exhaust case 67. For example, one or more struts 40 may be disposed between a hub and shroud of the turbine exhaust case 67, and/or, one or more struts 40 may be disposed between hub 36 and shroud 38, which may be the lobed mixer disposed downstream of the turbine exhaust case 67.

Welds and fastener joints may function complementarily to provide an appropriate flexibility and stiffness in the structure of the exhaust duct 30, since the stiffness of welds and fastener joints may be different. In some embodiments, having one or more fastener joints may also simplify the assembly or manufacturing of the exhaust duct 30.

During operation of the gas turbine engine 10, the exhaust duct 30 may undergo dynamic loading, including axial and torsional loading from adjacent engine components via joints or due to the flow of exhaust gas 69 and/or bypass air 68 interacting with components of the exhaust duct 30. Loading on the shroud 38 may cause radial bending of the shroud 38 which may cause loading on other components of the exhaust duct 30. Axial loading on the strut 40 may also induce loading on the hub 36 and/or shroud 38. Torque on the strut 40 may induce loading on the hub 36 and/or shroud 38 as well. In various embodiments, exhaust duct 30 described herein may be configured to mitigate unwanted deformation of components of the exhaust duct 30.

FIG. 2 is an exploded sectional view of part of an exemplary exhaust duct 30 in the axial-radial plane 72. The hub 36 may comprise a receptacle 58 opening into the annular gas path 66. The strut 40 may be secured to the hub 36 via an aft fastener connection 80 and a forward fastener connection 78. The aft fastener connection 80 may be achieved by way of the appendage 56 of the strut 40 being received in the receptacle 58 and fastened therein as explained further below. The aft fastener connection 80 and the forward fastener connection 78 may be axially spaced apart along the central engine axis 20 to provide a dual attachment configuration between the strut 40 and the hub 36. The two attachment locations may both serve to transfer loads between the hub 36 and the strut 40. In other words, as opposed to a single attachment location providing a single load path, the two attachment locations may spread the loads between the hub 36 and the strut 40 over two axially spaced apart and separate load paths.

The shroud 38 may extend around the central engine axis 20 and may at least partially surround the hub 36 to define a substantially annular (not necessarily circular) exhaust gas path 66, which may or may not include obstructions. The shroud 38 may be configured as a lobed mixer, including lobes 39 (shown in FIG. 10) extending axially and radially. However, the shroud 38 may have other configurations. The exhaust gas path 66 may have a central axis that is coaxial and/or parallel to the central engine axis 20.

The strut 40 may extend into the substantially annular exhaust gas path 66 and may radially span the annular exhaust gas path 66 so as to extend between the shroud 38 and the hub 36. The exhaust duct 30 may contain a plurality of struts 40 extending across the annular exhaust gas path 66. The struts 40 may be aerodynamic (e.g., airfoil) components that prepare the flow of combustion gas 69 for mixing with the released bypass air 68 and may also provide structural support within the exhaust duct 30. The strut 40 or a plurality thereof, may be positioned in the exhaust duct 30 and may be fastened or attached to the hub 36 using corresponding forward and aft fastener connections 78, 80.

The hub 36 may define a radially-inner surface 48 of the substantially annular exhaust gas path 66 extending around the engine axis 20. The radially-inner surface 48 may be a radially-outer surface of the hub 36 and may define a radially-inner boundary of the annular exhaust gas path 66. The receptacle 58 may be open to the radially-inner surface 48. In other words, the receptacle 58 may be disposed on the radially-inner surface 48. The shroud 38 (e.g., lobed mixer) may define a radially-outer surface 50 (i.e., radially-outer boundary) of the substantially annular exhaust gas path 66. The hub 36 may include a rib 64 extending radially inwardly, away from the exhaust gas path 66, from a surface of the hub 36 opposite to the radially-inner surface 48 of the exhaust gas path 66. The rib 64 may extend partially or completely circumferentially about the engine axis 20.

The strut 40 may have a leading edge 54 and a trailing edge 52, which may be spaced apart from each other at least partially in the axial direction 32. The trailing edge 52 and the leading edge 54 may refer to edges of the strut 40 ordered relative to the direction of the flow of combustion gas 69.

The strut 40 may extend between the hub 36 and the shroud 38. The strut 40 may extend between the radially-inner surface 48 and the radially-outer surface 50. The radially-inner end 60 of the strut 40 may be attached to the radially-inner surface 48 via a first fastener 88 (e.g., bolt, screw, rivet), and via a second fastener 90 (e.g. a bolt, screw, rivet). The first fastener 88 may be disposed at a forward fastening location 89 closer to the leading edge 54 than to the trailing edge 52 of the strut 40, while the second fastener 90 may be disposed at an aft fastening location 91 closer to the trailing edge 52 than to the leading edge 54 of the strut 40. The second fastener 90 may be disposed axially downstream of the first fastener 88 relative to the central engine axis 20.

The appendage 56 of the strut 40 may be formed near or at the trailing edge 52 of the strut 40 and may be configured to be received into the receptacle 58 formed in the hub 36. The appendage 56 may be used to secure the trailing edge 52 to the hub 36. The second fastener 90 may be installed to engage with the appendage 56. The appendage 56 may extend radially inwardly from the trailing edge 52 of the strut 40, away from the exhaust gas path 66, and may be axially coincident with the trailing edge 52 of the strut 40 relative to the central engine axis 20. The strut 40 may be removably attached to the hub 36 via a double attachment arrangement comprising the forward and aft fastener connections 78, 80. The forward and aft fastener connections 78, 80 may each include one or more fastener components, such as a threaded fastener and a complementary threaded hole or nut, to fasten the strut 40 to the hub 36.

The strut 40 may also be attached to the shroud 38. The radially-outer end 62 of the strut 40 may be in unitary construction or otherwise integral with the shroud 38. For example, the radially-outer end 62 of the strut 40 may be welded to the radially-outer surface 50 and/or fastened thereto via one or more rivets or threaded fasteners.

During installation, the radially-outer end 62 of the strut 40 may be attached (e.g., welded, fastened) to the shroud 38 before attaching the radially-inner end 60 of the strut 40 to the hub 36. Assembly of the strut 40 with the hub 36 may be achieved by relative axial movement between the hub 36 and the strut 40 already attached to the shroud 38. The receptacle 58 may also be axially rearwardly open so as to receive the appendage 56 therein by relative axial movement. Once the appendage 56 is received in the receptacle 58, the tail cone 26 may be also be assembled with the hub 36 by relative axial movement between the hub 36 and the tail cone 26. The aft fastener connection 80 may be achieved by installing the fastener 90 to engage with the hub 36, the appendage 56 and the tail cone 26 together. The forward fastener connection 78 may be achieved by installing the fastener 88 to engage with the hub 36 and the strut 40.

FIG. 3 is a perspective view of the strut 40 of FIG. 2 shown in isolation.

FIG. 4A is an enlarged view of region 410 of the strut 40 of FIG. 3. FIG. 4B is an enlarged side elevation view of region 420 of the appendage 56 of FIG. 4A.

In reference to FIG. 3 and FIGS. 4A-4B, the appendage 56 may project radially inwardly from the trailing edge 52 of the radially-inner end 60 of the strut 40. The appendage 56 may be integrally formed with the strut 40 and/or in unitary construction therewith. For example, the appendage 56 may be part of a casting that includes the airfoil body of the strut 40. For example, the appendage 56 may be added to the strut 40 by way of additive manufacturing (e.g., 3D printing). Alternatively, the appendage 56 may be a separate component that is separately formed (e.g., machined, cast) and subsequently attached (e.g., welded) to the strut 40. Appendage 56 may be made from a same or a metallurgically compatible material as the remainder of strut 40. In some embodiments, strut 40 including appendage 56 may be made from a metallic material such as a nickel-based alloy for example.

The appendage 56, such as upper portion 92 of the appendage 56, may have a width $W_m$ that is wider than a width $W_s$ at the trailing edge 52 of the strut 40 in a lateral direction transverse to the central engine axis 20. The upper portion 92 of the appendage 56 may have sufficient axial length so that a cross-sectional area of the attachment between the airfoil body of the strut 40 and the appendage 56 is of sufficient size to safely transfer the applicable loads. Due to the tapering shape of the airfoil body of the strut 40 in the aft direction, the cross-sectional area of the attachment between the airfoil body of the strut 40 and the appendage 56 may be generally triangular or pie-shaped. Width $W_m$ may be selected based on forces to be transferred via the appendage 56 and the size(s) of one or more fasteners 90 extending through the appendage 56.

In some embodiments, the appendage 56 may have a four-sided (e.g., rectangular) shape extending at least partially radially-inwardly. The appendage 56 may have substantially flat or curved sides. In some embodiments, the appendage 56 may be tapered toward a radially inward direction. The appendage 56 and the receptacle 58 may have cooperating shapes so as to provide a relatively secure mating engagement between the appendage 56 and the receptacle 58. For example, the appendage 56 and receptacle 58 may be shaped to provide some positional interlocking in one or more degrees of freedom.

The appendage 56 may include one or more holes 57 for receiving one or more second fasteners 90. In various embodiments, the hole 57 may have a central hole axis 83 that is parallel or non-parallel (e.g., oblique, transverse) to the central engine axis 20. The central hole axis 83 may be characterized by perpendicular vector components such as an axial vector component 83-*a* and a radial vector component 83-*r*. In some embodiments, the axial vector component 83-*a* may be greater than a radial vector component 83-*r*. In some embodiments, the radial vector component 83-*r* may be substantially zero where the central hole axis 83 is substantially parallel to the central engine axis 20. In some embodiments, the axial vector component 83-*a* may be substantially zero where the central hole axis 83 may be substantially perpendicular to the central engine axis 20 as shown in FIG. 9.

Figure 5:
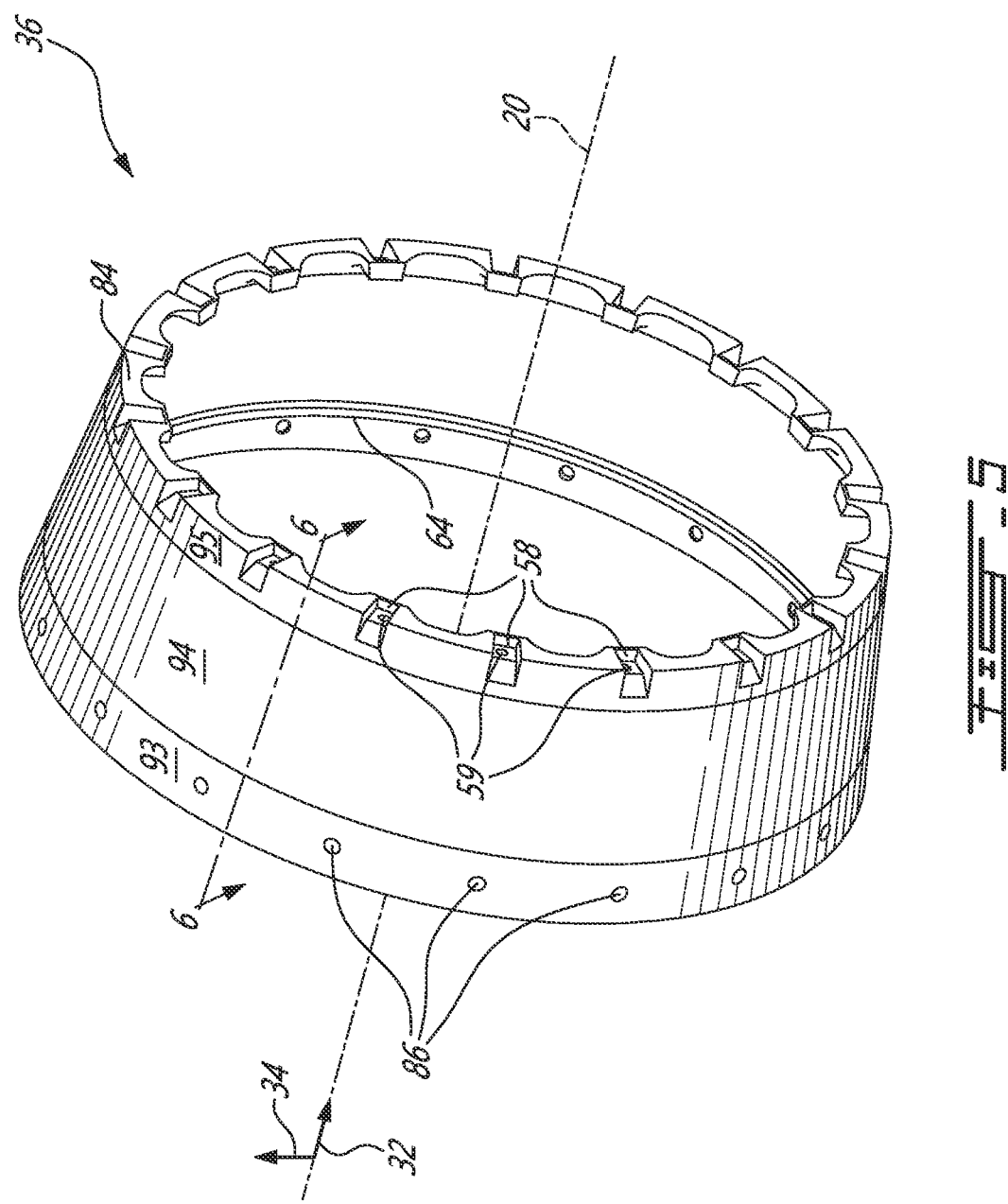
FIG. 5 is a perspective view of an exemplary hub of the exhaust duct of FIG. 2.

FIG. 5 is a perspective view of the hub 36 of FIG. 2 shown in isolation.

FIG. 6 is perspective view of part of the hub 36 of FIG. 5 sectioned along the line 6-6 of FIG. 5.

In reference to FIGS. 5 and 6, the rib 64 may have an angular span around the central engine axis 20 over at least a majority of a circumference of the hub 36 (as shown in FIG. 5). For example, the rib 64 may extend completely or partially around the central engine axis 20. For example, the extension of the rib 64 around the central engine axis 20 may be continuous or intermittent. In some embodiments, an axial cross-sectional profile of the rib 64 may be substantially uniform around the central engine axis 20.

The rib 64 may be disposed between the leading and trailing edges 54, 52 of the strut 40 when the strut 40 is fastened to the hub 36. Accordingly, the rib 64 may be disposed axially between the forward and aft fastening locations 89, 91. The rib 64 may be disposed forward or aft of the fastener hole 86 of the forward wall portion 93 when the strut 40 is fastened to the hub 36. In some embodiments, the rib 64 may be disposed closer to the leading edge 54 of the strut 40 than to the trailing edge of the strut 40. The rib 64 may function as a stiffener for the hub 36. Accordingly, the presence of the rib 64 may provide increased resistance to deformation (e.g., bending) of the hub 36 during operation of exhaust duct 30.

The hub 36 may include a forward wall portion 93 (e.g. a forward ring) forward of the rib 64 and an aft wall portion 95 aft of the rib 64 (e.g. aft ring). The forward and aft wall portions 93, 95 may define part of the radially-inner surface 48 of the hub 36. The forward wall portion 93 may include a fastener hole 86 (or a plurality thereof) for receiving the first fastener 88 therethrough. In some embodiments, the forward wall portion 93 and/or the aft wall portion 95 may be thicker than an intermediate wall portion 94 disposed between the forward and aft wall portions 93, 95, e.g. in unitary construction or integrated therewith.

The hub 36 (e.g., the aft wall portion 95 thereof) may include a plurality of the receptacles 58 at an axial end 84 of the hub 36 to facilitate the aft fastener connections 80 with individual appendages 56 of respective struts 40. The receptacles 58 may circumferentially distributed about the hub 36. Each receptacle 58 may include a hole 59 for receiving the second fastener 90. The hole 59 may be disposed and oriented for alignment with the cooperating hole 57 on the appendage 56 to facilitate the fastening of the appendage 56 to the hub 36 via the second fastener 90. In some embodiments, the receptacle 58 may be at least partially open in the axial direction 32 to permit the appendage 56 to be received and withdrawn from the receptacle 58 by relative axial movement between the strut 40 and the hub 36. The appendage 56 may be fastened to the hub 36 via second fastener 90 after the appendage 56 is received in the receptacle 58.

Figure 8:
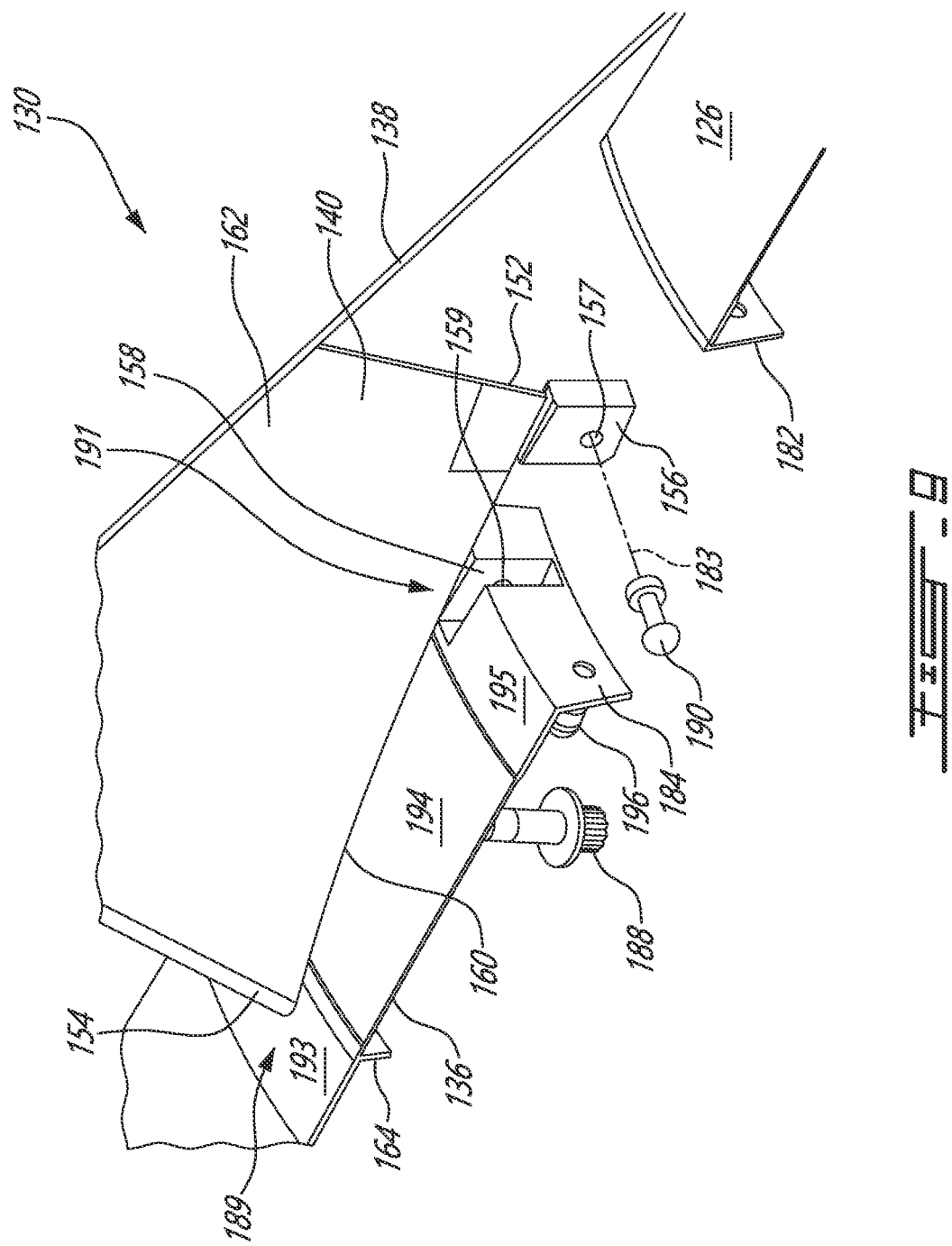
FIG. 8 is a perspective view of a section of the exhaust duct of FIG. 2 taken in an axial-radial plane, showing the strut engaged with the hub at a forward fastening location of the strut.

FIGS. 7 and 8 are perspective views of a section of the exhaust duct 30 parallel to the axial-radial plane 72. FIG. 7 shows the appendage 56 of the strut 40 as it is engaged in the receptacle 58 and fastened therein at the aft fastening location 91. FIG. 8 shows the fastening of the strut 40 to the hub 36 at the forward fastening location 89. The aft and forward fastener connections 80, 78 are shown in a fully-assembled state in FIGS. 7 and 8 respectively.

During assembly, the receptacle 58 may be closed or blocked in the axial direction 32 after the appendage 56 of the strut 40 is inserted therein and the abutting tail cone 26 is also installed. For example, the appendage 56 may be sandwiched between part of the hub 36 and part of the tail cone 26. The tail cone 26, appendage 56 of the strut 40, and the hub 36 may be interconnected with the second fastener 90. A forward end of the appendage 56 may be shaped to interface with the receptacle 58. An aft end of the appendage 56 may be shaped to interface with forward end of the tail cone 26 to facilitate a flush fit between the appendage 56 and tail cone 26 and also between the hub 36 and the tail cone 26.

In some embodiments, the appendage 56 may be fully received into the receptacle 58 to be substantially flush with and/or non-protruding into the exhaust gas path 66. The aft fastener connection 80 between the strut 40 and the hub 36 may be made entirely outside of the exhaust gas path 66. In various embodiments, the second fastener 90 may include a bolt, a pin, a screw and/or a rivet.

As mentioned previously, the forward wall portion 93 may be thicker than adjacent parts of the hub 36. For example, a portion of the hub 36 at the location of the forward fastening location 89 may be radially thicker than the intermediate portion 94 and also thicker than a front portion 99 that is forward of the strut 40. For example, the radially thicker portion(s) may have wall thickness $t_f$ while other (e.g., adjacent) portions of the hub 36, such as the intermediate wall portion 94 may have a wall thickness $t_s < t_f$. The greater thickness $t_f$ may provide greater stiffness for the hub 36. Accordingly, the greater thickness $t_f$ of the forward wall portion 93 may provide increased resistance to deformation (e.g., bending) of the hub 36 during operation of exhaust duct 30. In some embodiments, the rib 64 may be integrated with or in unitary construction with the forward wall portion 93 of the hub 36.

In various embodiments, the first fastener 88 may include a bolt, a screw and/or a rivet. In some embodiments, the first fastener 88 may be engaged by threaded engagement with a threaded hole formed in the strut 40 or a threaded insert engaged with the strut 40 and accessible from the radially-inner end 60 of the strut 40. Accordingly, the first fastener 88 may be inserted into and engaged with the strut 40 via the inside of the hub 36. In some embodiments, the first fastener 88 of the forward fastening location 89 and the second fastener 90 of the aft fastening location 91 may be non-parallel (e.g., oblique or transverse to each other).

In reference to FIGS. 7 and 8, the rearwardly axially open receptacle 58 may facilitate the insertion (e.g., sliding) of the appendage 56 into the receptacle 58 by way of relative translation movement along the axial direction 32. The radially-inner end 60 of the strut 40 may engage with the radially-inner surface 48 of the exhaust gas path 66 defined by the hub 36.

FIG. 9 is a perspective exploded view of another exemplary exhaust duct 130, showing an embodiment of a strut 140 having an appendage 156 at or near the trailing edge 152 of the strut 140. Parts of the exhaust duct 130 similar to parts of the exhaust duct 30 described above are labelled using similar reference numerals incremented by 100. FIG. 9 shows the radially-inner end 160 of the strut 140 ready for assembly with the hub 136. The radially-outer end 162 of the strut 140 may be attached (e.g., welded and/or fastened) to the shroud 138 before the insertion of the appendage 156 into the receptacle 158 of the hub 136. The appendage 156 may be axially insertable into the receptacle 158. The appendage 156 may be fastened in the receptacle 158 via the second fastener 190 (e.g., rivet, bolt, screw, pin) extending through the hole 159 and the hole 157. The axial end 184 of the hub 136 may be fastened to the axial end 182 of the tail cone 126 via a third fastener 196 (e.g., rivet, bolt, screw) extending through corresponding holes formed in the tail cone 126 and the hub 136. The second fastener 188 (e.g., rivet, bolt, screw) may be used to secure the strut 140 to the hub 136 at the forward fastening location 189 closer to the leading edge 154 of the strut 140 than to the trailing edge 152 of the strut 140.

The hole 157 may have a central hole axis 183 that is non-parallel (e.g., oblique, transverse) to the central engine axis 20. The hub 136 may include a forward wall portion 193 forward of the rib 164 and an aft wall portion 195 aft of the rib 164. In some embodiments, the rib 164 may be disposed forward of the forward fastening location 189. The second fastener 190 may be oriented non-parallel (e.g., transversely, obliquely) to the third fastener 196.

FIG. 10 is a perspective view of an exemplary shroud 38 configured as a lobed mixer including lobes 39 extending axially and radially. In some embodiments, the lobes 39 may be circumferentially distributed around the central engine axis 20 to define an alternating arrangement of crests and troughs. The lobes 39 may promote mixing of the hot combustion gas 69 with the relatively cold bypass air 68 exhausted from the bypass duct 70 of the engine 10.

Figure 11:
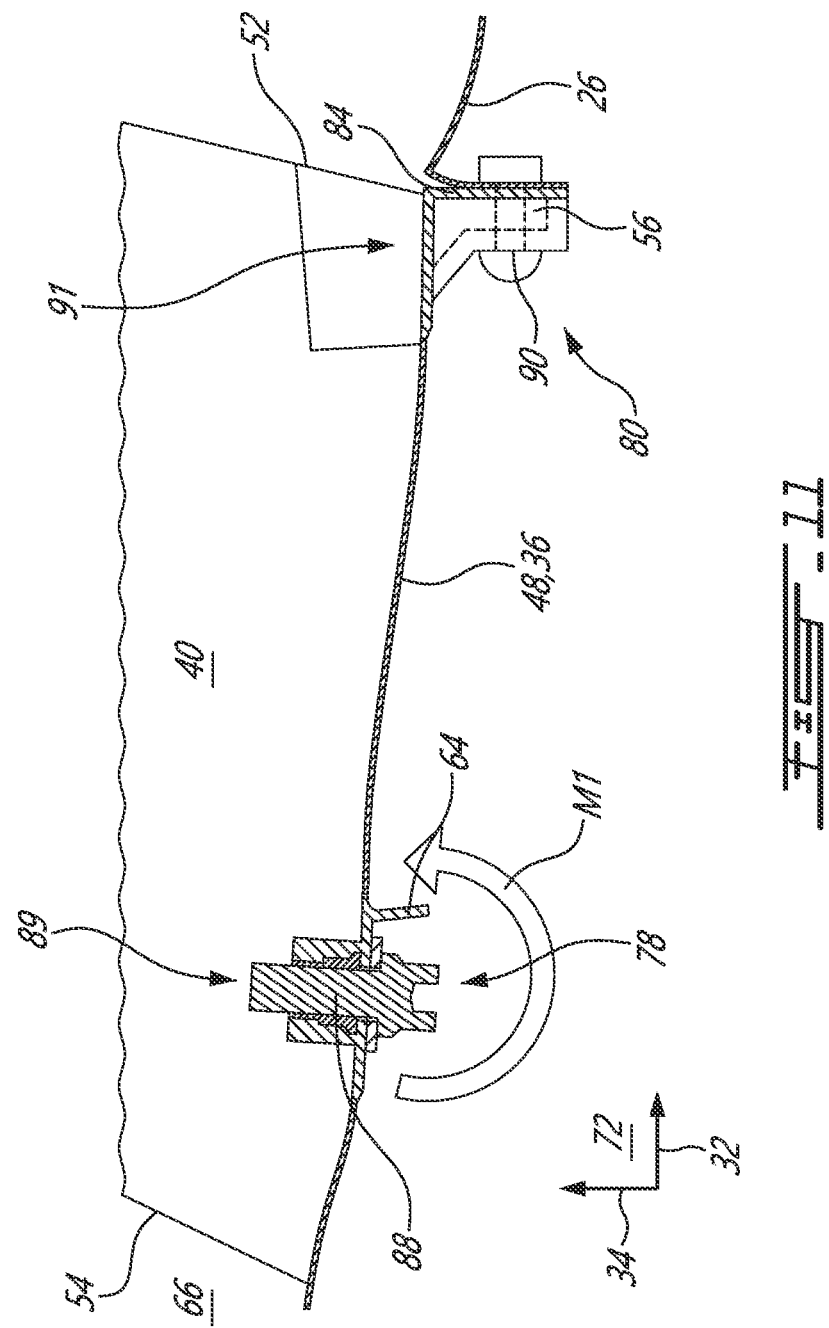
FIG. 11 is a view of an exemplary exhaust duct in a axial-radial plane showing magnified deformation under simulated axial loading.

FIG. 11 is an enlarged side view of an exemplary exhaust duct 30 in the axial-radial plane 72 showing magnified deformation of the exemplary exhaust duct 30 under a simulated application of a rearward axial load on the hub 36 relative to strut 40. The direction of the magnified deformation at the forward fastening location 89 under this type of loading is indicated by arrow M1.

FIG. 12 is a view of the exemplary exhaust duct 30 of FIG. 11 in a radial-angular plane (i.e., along the central engine axis 20) showing magnified deformation of the strut 40 and radially-inner surface 48 of the hub 36, under simulated torsional loading on the hub 36 relative to the strut 40. The direction of the magnified deformation at the forward fastening location 89 under this type of loading is indicated by arrow M2. The two attachment locations (e.g., forward fastening location 89 and aft fastening location 91) may be more flexible than welds and may also spread the loads between the hub 36 and the strut 40 over two axially spaced apart and separate load paths. The presence of the rib 64 (not shown in FIG. 12) may provide some resistance to the deformation M2 of the hub 36.

FIG. 13 is a flow chart of an exemplary method 1200 of attaching a strut 40 in a substantially annular exhaust gas path 66 defined by a exhaust duct 30 of gas turbine engine 10. While the method 1200 is described in relation to the exhaust duct 30, it is understood that the method 1200 can be performed in conjunction with the exhaust duct 130 or other exhaust ducts. Method 1200 may include: receiving the shroud 38 with the strut 40 attached thereto (see block 1205); receiving the appendage 56 of the strut 40 into the receptacle 58 of the hub 36 open to the radially-inner surface 48 (see block 1210); fastening the strut 40 to the hub 36 at the forward fastening location 89 closer to the leading edge 54 of the strut than to the trailing edge 52 of the strut 40 (see block 1220); fastening the appendage 56 to the hub 36 at the aft fastening location 91 closer to the trailing edge 52 than to the leading edge 54 (see block 1230).

In some embodiments, method 1200 may comprise engaging the second fastener 90 with the appendage 56, the hub 36 and a tail cone 26 of the gas turbine engine 10.

In some embodiments, the method 1200 may comprise abutting the tail cone 26 against an aft end, e.g. axial end 84, of the hub 36 adjacent to the receptacle 58. Fastening the strut 40 to the hub 36 at the aft fastening location 91 may include engaging the fastener 90 with the tail cone 26, the appendage 56, and the hub 36 to secure the tail cone 26, the strut 40, and the hub 36 together.

The receptacle 58 may be disposed at an aft end 84 of the hub 36 and may be open to the aft end 84 of the hub 36 to permit insertion of the appendage 56 into the receptacle 58 generally axially along the central engine axis 20. The method 1200 may include abutting the tail cone 26 against the aft end 84 of the hub 36 so that the appendage 56 is sandwiched between the hub 36 and the tail cone 26. The method 1200 may include engaging a fastener with the hub 36, the appendage 56 and optionally also the tail cone 26.

FIG. 14 is a graphical representation of an exemplary method of attaching strut 40 in the exhaust duct 30. Arrow 1 illustrates forward axial movement of the tail cone 26 and the appendage 56 toward the hub 36 in order to insert the appendage 56 into the receptacle 58 and bring the tail cone 26 together with the hub 36 where the appendage 56 is sandwiched between the hub 36 and the tail cone 26. Alternatively or in addition, arrow 2 illustrated aft axial movement of the hub 36 toward the tail cone 26 in order to insert the appendage 56 into the receptacle 58 and bring the tail cone 26 together with the hub 36 where the appendage 56 is sandwiched between the hub 36 and the tail cone 26. Arrow 3 represents the fastening of the hub 36 with the appendage 56 and the tail cone 26 using the second fastener 90. Arrow 4 represents the fastening of the strut 40 to the hub 36 using the first fastener 88.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbofan gas turbine engine comprising:
   a combustor in which compressed air is mixed with fuel and ignited for generating an annular stream of hot combustion gas;
   a turbine for extracting energy from the combustion gas, the turbine having a rotation axis;
   a hub defining a radially-inner surface of a substantially annular exhaust gas path extending around the rotation axis and disposed downstream of the turbine for receiving the combustion gas, the hub including a receptacle formed into the radially-inner surface;
   a lobed mixer defining a radially-outer surface of the substantially annular exhaust gas path; and
   a strut extending between the radially-inner surface and the radially-outer surface of the substantially annular exhaust gas path, the strut attached to the hub via a first fastener and via a second fastener, the second fastener being disposed axially downstream of the first fastener relative to the rotation axis of the turbine, the strut including an appendage received into the receptacle of the hub, the second fastener being engaged with the appendage.

2. The turbofan gas turbine engine as defined in claim 1, wherein the appendage is axially coincident with a trailing edge of the strut relative to the rotation axis of the turbine.

3. The turbofan gas turbine engine as defined in claim 1, wherein the first and second fasteners are oriented in a non-parallel manner.

4. The turbofan gas turbine engine as defined in claim 3, wherein the second fastener extends through the appendage and is entirely disposed radially inwardly of the radially-inner surface.

5. A gas turbine engine exhaust duct comprising:
   a hub defining a radially-inner surface of a substantially annular exhaust gas path of a gas turbine engine, the hub including a receptacle open to the exhaust gas path;
   a shroud defining a radially-outer surface of the exhaust gas path; and
   a strut extending into the annular exhaust gas path between the radially-inner surface and the radially-outer surface, the strut including a leading edge and a trailing edge, the strut attached to the hub via a first fastener at a forward fastening location closer to the leading edge than to the trailing edge, and via a second fastener at an aft fastening location closer to the trailing edge than to the leading edge, the strut including an appendage received into the receptacle of the hub, the second fastener being engaged with the appendage.

6. The gas turbine engine exhaust duct as defined in claim 5, wherein the shroud includes a lobed mixer and the strut is attached to the lobed mixer.

7. The gas turbine engine exhaust duct as defined in claim 6, wherein the strut is welded to the lobed mixer.

8. The gas turbine engine exhaust duct as defined in claim 5, wherein the appendage extends radially inwardly from the trailing edge of the strut relative to a central axis of the substantially annular exhaust gas path.

9. The gas turbine engine exhaust duct as defined in claim 5, wherein the appendage is wider than the trailing edge of the strut in a direction transverse to a central axis of the substantially annular exhaust gas path.

10. The gas turbine engine exhaust duct as defined in claim 5, wherein the appendage includes a hole for receiving the second fastener, the hole having a central hole axis that is transverse to a central axis of the substantially annular exhaust gas path.

11. The gas turbine engine exhaust duct as defined in claim 5, wherein the appendage includes a hole for receiving the second fastener, the hole having a central hole axis that has an axial vector component and a radial vector component relative to a central axis of the substantially annular exhaust gas path, the axial vector component being greater than the radial vector component.

12. The gas turbine engine exhaust duct as defined in claim 11, wherein the second fastener is engaged with the hub, the appendage and a tail cone of the gas turbine engine.

13. The gas turbine engine exhaust duct as defined in claim 12, wherein the appendage is sandwiched between a part of the hub and a part of the tail cone of the gas turbine engine.

14. The gas turbine engine exhaust duct as defined in claim 5, wherein:
the first fastener is engaged with the hub and with the strut; and
the hub includes a rib extending radially inwardly, the rib having an angular span around a central axis of the substantially annular exhaust gas path over at least a majority of a circumference of the hub.

15. The gas turbine engine exhaust duct as defined in claim 14, wherein the rib is disposed axially between the forward and aft fastening locations relative to the central axis of the substantially annular exhaust gas path.

16. The gas turbine engine exhaust duct as defined in claim 14, wherein:
the hub includes a first wall portion forward of the rib and a second wall portion aft of the rib relative to the central axis of the substantially annular exhaust gas path, the first and second wall portions defining at least part of the radially-inner surface of the substantially annular exhaust gas path;
the first wall portion includes a fastener hole receiving the first fastener therethrough; and
the first wall portion is thicker than the second wall portion.

17. The gas turbine engine exhaust duct as defined in claim 5, wherein the first and second fasteners are oriented in a non-parallel manner.

18. A method of attaching a strut in a substantially annular exhaust gas path defined by an exhaust duct of a gas turbine engine, the exhaust duct having a hub defining a radially-inner surface of the exhaust gas path, and a shroud defining a radially-outer surface of the exhaust gas path, the strut extending between the radially-inner surface and the radially-outer surface of the substantially annular exhaust gas path, the method comprising:
receiving the shroud with the strut attached thereto;
receiving an appendage of the strut into a receptacle of the hub, the appendage being disposed at an aft fastening location closer to a trailing edge of the strut than to a leading edge of the strut and the receptacle being formed in the radially-inner surface;
fastening the strut to the hub at a forward fastening location closer to the leading edge of the strut than to the trailing edge of the strut via a first fastener; and
fastening the appendage to the hub via a second fastener engaged with the appendage.

19. The method of claim 18, comprising engaging the second fastener with the appendage, the hub and a tail cone of the gas turbine engine.

20. The method of claim 18, wherein:
the receptacle is disposed at an aft end of the hub and is open to the aft end of the hub;
the method includes abutting a tail cone against the aft end of the hub so that the appendage is sandwiched between the hub and the tail cone; and
the method includes engaging the second fastener with the hub, the appendage and the tail cone.

* * * * *